June 4, 1963   E. A. LAINE   3,091,844
METHOD OF MAKING FLEXIBLE JOINTS
Filed May 16, 1960

3,091,844
METHOD OF MAKING FLEXIBLE JOINTS
Edward A. Laine, Leechburg, Pa., assignor to Allegheny Ludlum Steel Corporation, Brackenridge, Pa., a corporation of Pennsylvania
Filed May 16, 1960, Ser. No. 29,361
2 Claims. (Cl. 29—437)

This invention relates to a method of making joints for connecting strips of metal.

In the steel industry where rolling deformation is applied to strips of metal, a metal leader is usually applied to each end of the strip and secured thereto as by welding in order to provide leading ends through which the pull is applied to a strip as the strip moves in alternate directions through a reversing mill. Also, where it is desired to connect the end of one strip to another strip so as to obtain a longer resulting strip to be supplied to the rolling mill, such ends are usually cropped to provide matching ends which are then welded to provide a strong joint to withstand the tension encountered during the rolling and coiling operations.

While welded joints as used heretofore usually provide adequate strength, the resulting joint is quite stiff and usually has a thickness greater than the thickness of the strip, the resulting increase in thickness sometimes causing difficulties in the rolling operation. Because of the stiffness and oftentimes brittleness of the welded joints, such joints often fracture with the result that considerable scrap is sometimes generated during a rolling operation.

An object of this invention is to provide a method of making a mechanical interlocking connection between the ends of two aligned metal strips, which connection is relatively flexible to permit slight angular movement of the strips relative one to the other at the interlocking connection.

Other objects of this invention will become apparent from the following description when taken in conjunction with the accompanying drawing in which.

Figure 1:
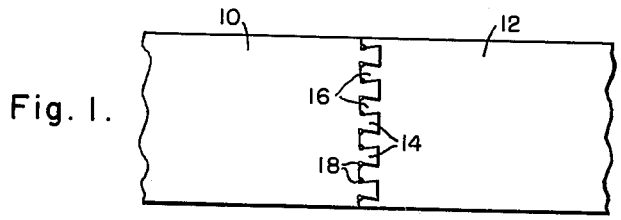
FIGURE 1 is a top plan view of a joint construction between a strip of metal and a leader and which embodies features of this invention.
Figure 2:
FIG. 2 is a view in side elevation and partly in section of the joint construction of FIG. 1.

Referring to the drawing, and in particular to FIG. 1 thereof, this invention is illustrated as utilizing a joint formed between a strip 10 of steel and a leader 12 of metal that is utilized for introducing the strip 10 into the bite of a rolling mill (not shown) or as leaders on each end of the strip which is to be reduced in a reversing mill (not shown). In practice, the strip 10 has a gauge or thickness considerably in excess of the thickness of the leader 12 as is clearly illustrated in FIG. 2. While the strip 10 has been said to be of steel, it is, of course, to be understood that the strip 10 can be formed of any of the well-known alloys having an iron, nickel or cobalt base or of the refractory metals such as titanium or zirconium. Likewise, the leader 12 may be of any suitable metal capable of withstanding the pull applied thereto as the assembly is fed to a rolling mill and may, if desired, be of the same metal as that of the strip 10.

In accordance with this invention, the strip 10 and leader 12 are aligned and the adjacent edges thereof are punched, severed or otherwise cut to form a series of protruding portions 14 on the strip 10 and a series of protruding portions 16 on the leader 12, the portions 14 and 16 being complementary, one to the other, so that each portion 16 of the leader 12 will fit into the spaces provided between adjacent portions 14 of the strip 10 to provide an interlocking engagement therebetween. As illustrated in FIG. 1, it is apparent that the interlocking engagements between the portions 16 and the portions 14 are, in effect, a keying action with the sides of the protruding portion 16 seating against the sides of adjacent protruding portions 14 as a pull is applied to the leader 12.

In order to prevent a disengagement of the interlocking engagement formed between the protruding portions 14 and 16, the strip 10 is deformed as by punching or swaging the metal at the base of certain of its protruding portions 14 to force a small portion of the metal thereof inwardly of the space of the adjacent portions 14 to form a bead 18 or the like that overlaps the end of the portion 16 positioned in such space. Such beads 18 are preferably formed on both sides of the strip 10 so that such beads will overlap both sides of the end of at least some of the portions 16 positioned therebetween to prevent disengagement of the interlocked portions. With the beads 18 formed as described, relative slight angular movement is permitted between the strip 10 and the leader 12 in the area of the joint structure, but the interlocking engagement between the protruding portions 14 and 16 is maintained throughout the rolling operation of effecting a deformation of the strip 10.

Figure 3:
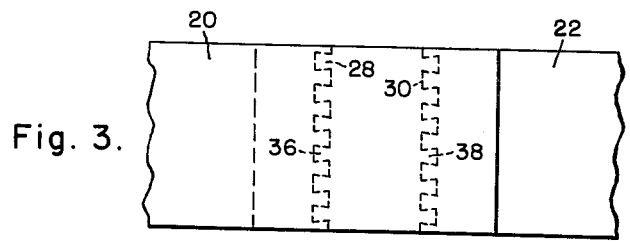
FIG. 3 is a plan view of the assembly of two substantially aligned metal strips overlapped with severing lines shown thereon in dot-dash outline for making a joint construction in accordance with an embodiment of this invention.
Figure 4:
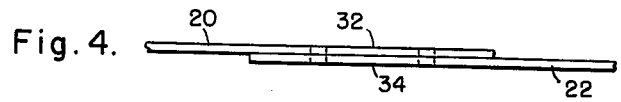
FIG. 4 is a view in side elevation of the overlapped strips of FIG. 3.
Figure 5:
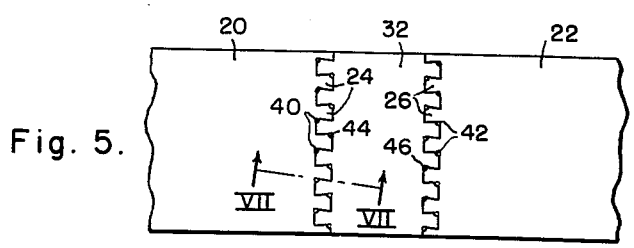
FIG. 5 is a plan view of a joint connection made in accordance with an embodiment of this invention and which embodies a connector resulting from the overlapped and severed assembly illustrated in FIGS. 3 and 4.
Figure 6:
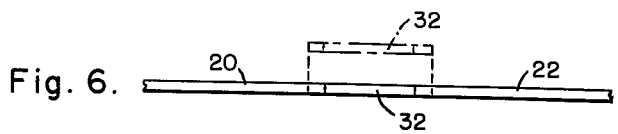
FIG. 6 is an edge view of the joint connection utilized in the structure of FIG. 5 and illustrating the connector in dot-dash outline displaced from the assembled joint structure.

In another embodiment of this invention where it is desired to connect two strips of metal having the same composition so as to provide an extended strip of metal, the two strips may be joined by means of a flexible joint as illustrated in FIGS. 3 through 6 of the drawing. In this embodiment two strips 20 and 22 of the same metal and having the same gauge or thickness and substantially the same width are disposed with the ends thereof in overlapped relation as illustrated in FIGS. 3 and 4. Such overlapped ends are severed in any suitable manner to provide an end on each strip which will have protruding spaced portions 24 and 26 on the strips 20 and 22, respectively, as illustrated in FIG. 5, such protruding portions resulting from severing the overlapped strips along the dot-dash lines 28 and 30 illustrated in FIGS. 3 and 4. Simultaneously with the forming of protruding portions 24 and 26 on the ends of the strips 20 and 22, two cut-out inserts 32 and 34 are formed from the strips 20 and 22, respectively, each of such inserts 32 and 34 having protruding portions 36 and 38 formed on opposite edges thereof and being complementary to the protruding portions 24 and 26, respectively, formed on the strips 20 and 22, respectively.

After the overlapped strips 20 and 22 are punched, sheared or otherwise cut to form the protruding portions 24 and 26 on the strips 20 and 22, respectively, as previously described, and to form the inserts 32 and 34 having protruding portions along the edges thereof, the strips 20 and 22 are aligned in the same plane and one of the inserts 32 or 34 is utilized as a connector to join the ends of the severed strips 20 and 22. In the embodiment illustrated in FIGS. 5 and 6, the insert 32 is used as a connector between the severed ends of the strips 20 and 22, it being noted that the connector 32 is positioned with the protruding portions 36 along one edge thereof disposed in the spaces provided between the protruding portions 24 on the end of strip 20 and with the protruding portions 38 disposed in the spaces provided between the protruding portions 26 on the end of the strip 22. Since the insert or connector 32 had its protruding portions 36 and 38 formed thereon simultaneously with the forming of the protruding portions 24 and 26 on the strips 20 and 22, respectively, the connector 32 will make a perfect connecting fit with the protruding portions carried on the ends of the strips 20 and 22.

Figure 7:
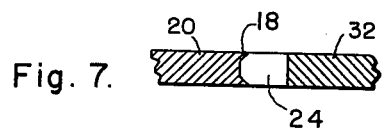
FIG. 7 is an edge view, partly in section and greatly enlarged, taken along the line VII—VII of FIG. 6.

As in the embodiment of FIG. 1, the connector 32 provides a positive keying connection between the ends of the strips 20 and 22. Likewise, in order to prevent a disengagement of the connector 32 from the end of either of strips 20 or 22, the strip 20 and the strip 22 are deformed as by punching or swaging at the base of a number of the protruding portions 24 and 26 to force a small portion of the metal thereof inwardly of the space between the adjacent portions 24 and adjacent portions 26 to form beads 40 and 42, respectively, which overlap the ends of the protruding portions 36 and 38 of the connector 32 which are disposed in the spaces between the portions 24 and the portions 26. Such beads can be formed as in the embodiment of FIG. 1 on both sides of the strips 20 and 22 so as to, in effect, overlap the protruding portions of the connector 32 which are disposed in the spaces between the protruding portions 24 and 26 carried by the strips 20 and 22, respectively. Instead of punching, swaging or otherwise forming the beads 40 and 42, such beads can be formed by welding. In addition, if it is desired, similar beads 44 and 46 can be formed on both sides of the connector 32 at the base of certain of the protruding portions 36 and 38, respectively, carried by the connector so as to overlap the protruding portions carried on the ends of the strips 20 and 22. The formation of the beads as by punching or welding is more clearly illustrated in the enlarged sectional view of FIG. 7.

The joint construction formed by this invention as described hereinbefore provides a flexible joint in that slight angular movement may be obtained between two joined strips of metal in the region of the joint structure. The resulting joint structure is quite strong, in practice having been found to be perfectly capable of withstanding tensions such as are applied in rolling strip metal. Further, the formation of the beads, whether by punching, swaging or applying a slight weld deposit as described, prevents the disengagement of the interlocking connection described, while still permitting slight angular, or in other words flexible, movement of one strip relative to another in the area of the joint construction.

I claim:
1. The method of forming a flexible joint between adjacent edges of two aligned longitudinally extending strips of metal having predetermined widths and thickness within the plane of at least one of said strips to facilitate passage of the joined strips through a rolling mill, comprising the steps of, forming complementary protruding portions having a dovetail shape with a relatively narrow base portion and being of a predetermined size on said adjacent edges, said protruding dovetail portions being in the planes of the respective strips and extending outwardly therefrom across the meeting edges of said strips, aligning and positioning said complementary dovetail portions of the adjacent meeting edges in interlocking engagement without increasing said predetermined widths of said strips, and deforming predetermined portions of the edges of at least some of said protruding dovetail portions adjacent the base portions only thereof on both sides of said strips and inwardly within the plane of said strips carrying said deformed protruding portions to provide a positive locking of said interlocking connection without an accompanying increase in thickness in the joint area while permitting slight relative movement between said interlocked protruding dovetail portions within the confines of the plane of the interlocked strips.

2. The method of foming a flexible joint between adjacent edges of a leader strip of metal having a predetermined thickness and a thicker strip of metal having a greater predetermined thickness than that of the leader strip within the plane of said thicker strip to facilitate passage of the joined strips through a rolling mill, comprising the steps of, forming complementary protruding portions having a dovetail shape and being of a predetermined size on said adjacent edges of the strips, said protruding dovetail portions being in the planes of the respective strips and extending outwardly therefrom across the meeting edges of said strips, aligning and positioning said complementary portions of the adjacent edges in interlocking engagement, and deforming predetermined portions of the edges only of at least some of said protruding dovetail portions of the thicker strip on both sides of said strip inwardly within its plane to provide a positive locking of said interlocking connection without an accompanying increase in thickness in the joint area while permitting slight relative movement between said interlocked protruding dovetail portions within the confines of the plane of said thicker strip.

References Cited in the file of this patent
UNITED STATES PATENTS

| | | |
|---|---|---|
| 70,383 | Wilmot | Oct. 29, 1867 |
| 384,449 | Kelsey | June 12, 1888 |
| 563,932 | Leavenworth | July 14, 1896 |
| 819,866 | Dobson | May 8, 1906 |
| 935,970 | Guett | Oct. 5, 1909 |
| 1,417,039 | Darrach | May 23, 1922 |
| 1,537,562 | Stock | May 12, 1925 |
| 1,999,818 | McIntyre | Apr. 30, 1935 |
| 2,330,207 | England et al. | Sept. 28, 1943 |
| 2,762,118 | Shaw et al. | Sept. 11, 1956 |